United States Patent [19]

Huyer

[11] Patent Number: 5,204,592
[45] Date of Patent: Apr. 20, 1993

[54] APPARATUS FOR OPERATING THE ROOF PANEL OF A SLIDING ROOF OR A SLIDING TILTING ROOF OF A MOTOR VEHICLE

[75] Inventor: Johannes N. Huyer, Velserbroek, Netherlands

[73] Assignee: Vermeulen-Hollandia Octrooien II B.V., Haarlem, Netherlands

[21] Appl. No.: 770,101

[22] Filed: Oct. 2, 1991

[30] Foreign Application Priority Data

Oct. 10, 1990 [NL] Netherlands .......................... 9002199

[51] Int. Cl.$^5$ .......................................... B60J 7/043
[52] U.S. Cl. ...................................... 318/466; 318/265; 318/286
[58] Field of Search .............. 318/264, 265, 266, 286, 318/466, 467, 468, 567, 569, 600, 626; 364/424.01, 424.05

[56] References Cited

U.S. PATENT DOCUMENTS

| | | | |
|---|---|---|---|
| 4,262,239 | 4/1981 | Kawa | 318/561 |
| 4,364,003 | 12/1982 | Phipps | 318/467 |
| 4,383,206 | 5/1983 | Matsuoka et al. | 318/445 |
| 4,498,033 | 2/1985 | Aihara et al. | 318/261 |
| 4,556,835 | 12/1985 | Vogel et al. | 318/663 |
| 4,563,625 | 1/1986 | Kornbrekke et al. | 318/603 |
| 4,608,637 | 8/1986 | Okuyama et al. | 364/424 |
| 4,706,194 | 11/1987 | Webb et al. | 364/424 |
| 4,831,509 | 5/1989 | Jones et al. | 364/167.01 |
| 4,835,449 | 5/1989 | Huehn | 318/282 |
| 4,874,995 | 10/1989 | Kawai et al. | 318/484 |
| 4,881,020 | 11/1989 | Hida et al. | 318/626 |
| 4,893,870 | 1/1990 | Moriya et al. | 296/223 |
| 4,910,445 | 3/1990 | Borrmann | 318/468 |
| 4,983,896 | 1/1991 | Sugiyama et al. | 318/286 |
| 4,994,724 | 2/1991 | Hsu | 318/603 |
| 5,081,586 | 1/1992 | Barthel et al. | 364/424.05 |

FOREIGN PATENT DOCUMENTS 3401864 8/1985 Fed. Rep. of Germany .

Primary Examiner—Bentsu Ro
Attorney, Agent, or Firm—Kinney & Lange

[57] ABSTRACT

An apparatus for operating the roof panel (1) of a sliding roof or a sliding/tilting roof comprises a motor (2) for moving the roof panel, a control unit (8) for energizing the motor and a setting means (11) for setting a desired position of the roof panel. At putting the apparatus into operation the control unit (8) energizes the motor (2) for moving the roof panel (1) to a (each) extreme open position. A corresponding end position of the roof panel is stored in a memory (12). During operation the control unit restricts the movement of the roof panel as controlled by the setting means (11) by means of the end position(s) stored in the memory.

10 Claims, 2 Drawing Sheets

APPARATUS FOR OPERATING THE ROOF PANEL OF A SLIDING ROOF OR A SLIDING TILTING ROOF OF A MOTOR VEHICLE

BACKGROUND OF THE INVENTION

The invention relates to an apparatus for operating the roof panel of a sliding roof or a sliding/tilting roof, comprising a motor for moving the roof panel, a control unit for energizing the motor and a setting means for setting a desired position of the roof panel.

Such an apparatus is known from DE-A-33 24 107. In this known apparatus a slip coupling between the motor and the roof panel is used in order to prevent the roof panel from mechanically jamming in extreme positions. Such a slip coupling shows the disadvantage that the system for moving the roof panel is relatively heavily loaded in these extreme positions, whereas the manufacturing costs are increased.

The invention aims to provide a simplified apparatus of the above-mentioned type, wherein an effective protection against jamming in the extreme positions is obtained without slip coupling.

SUMMARY OF THE INVENTION

To this end the apparatus according to the invention is characterized in that when the apparatus is put into operation the control unit energizes the motor for moving the roof panel to extreme open positions, wherein means are provided for storing a corresponding end position of the roof panel in a memory, and wherein the control unit restricts during operation the movement of the roof panel as controlled by the setting means by means of the end positions stored in the memory.

In this manner an effective protection against mechanically jamming the roof panel in the extreme open positions is obtained. Specifically, when the user chooses the maximum open position with the setting means, the control unit de-energizes the motor just before the extreme position of the roof panel is reached. To this end preferably a position just before the extreme open positions is stored in the memory as end positions. In this manner the system for moving the roof panel can be made without a slip coupling and undesired loads of the moving system do not occur.

Reaching of the roof panel to the extreme open positions can be detected in several ways. Preferably this is realized according to the invention in that a sensor for measuring the speed of movement of the roof panel is provided, wherein the control unit detects the reaching of the extreme open positions by means of the speed sensor.

According to a favourable embodiment of the invention a sensor is provided for detecting the closed position of the roof panel, wherein the control unit after moving the roof panel from the extreme open positions into the closed position, determines the position of the roof panel in the extreme sliding and tilting positions, respectively, from the signal of the speed sensor.

BRIEF DESCRIPTION OF THE DRAWINGS

The invention will be further explained by reference to the drawings in which an embodiment of the apparatus according to the invention is very schematically shown.

DETAILED DESCRIPTION OF THE PREFERRED EMBODIMENTS

Figure 1:
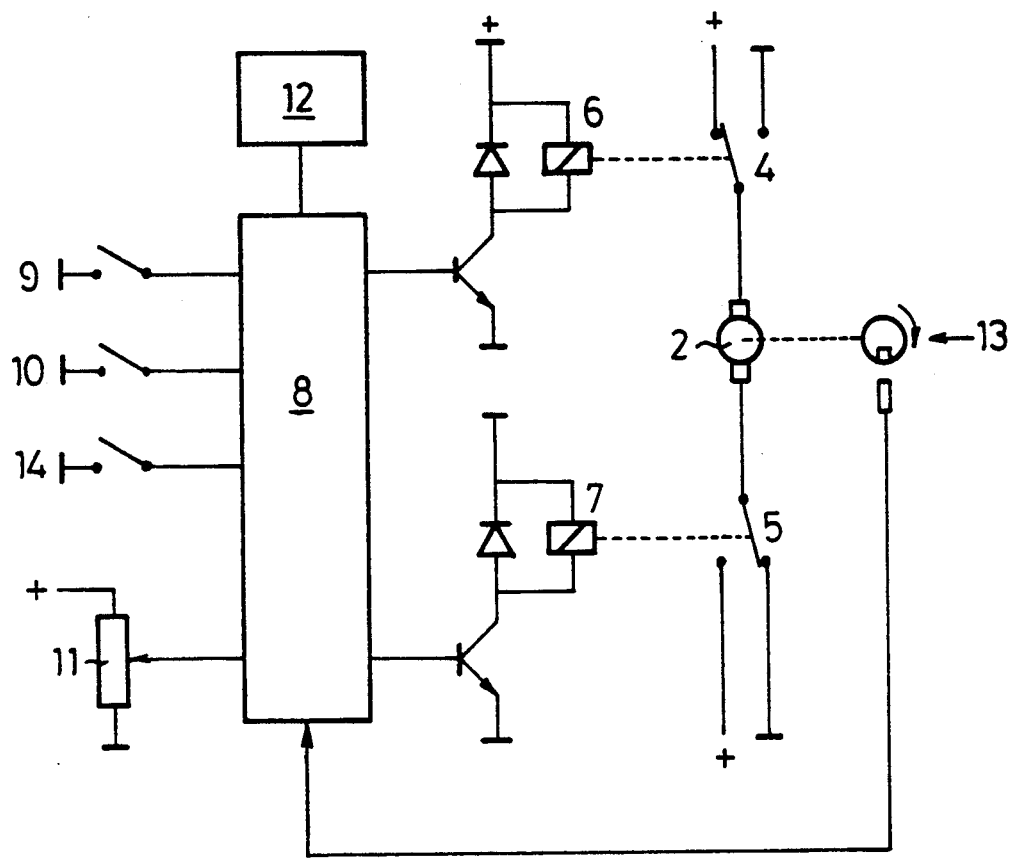
FIG. 1 is a very simplified circuit diagram of an embodiment of the apparatus according to the invention.
Figure 2:
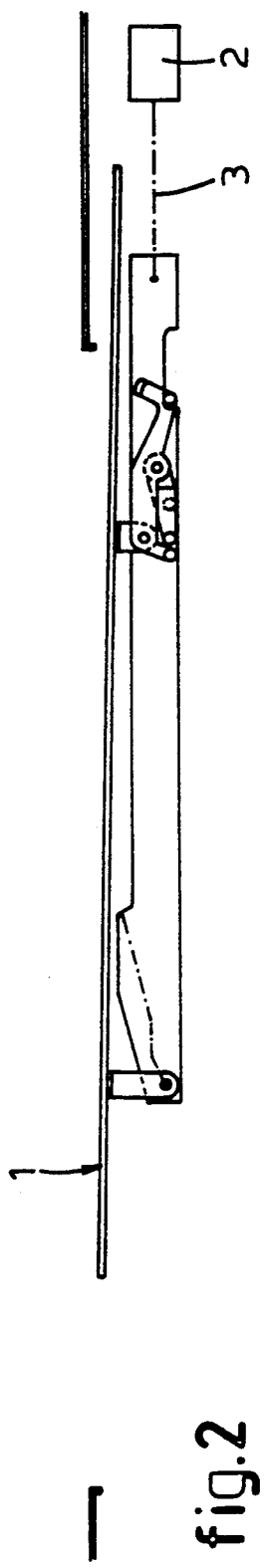
FIG. 2 shows very schematically the sliding/tilting roof, wherein the roof panel is in an open sliding position.
Figure 3:
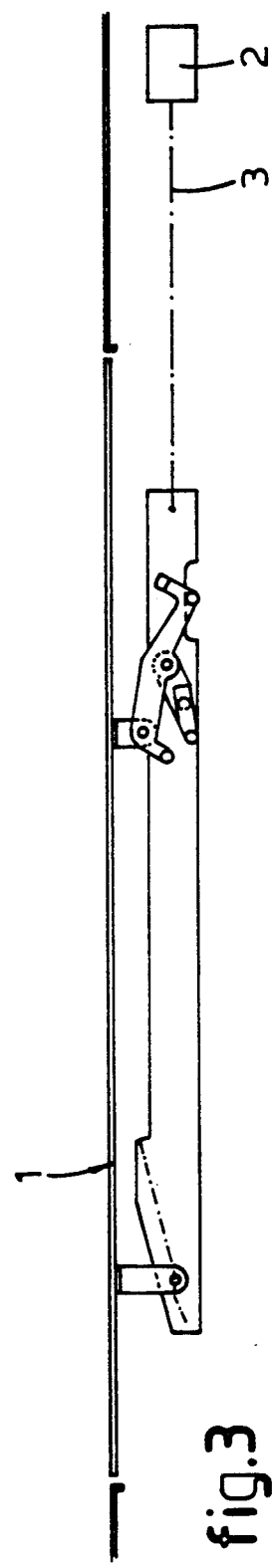
FIG. 3 shows the sliding/tilting roof of FIG. 2, wherein the roof panel is in the closed position.
Figure 4:
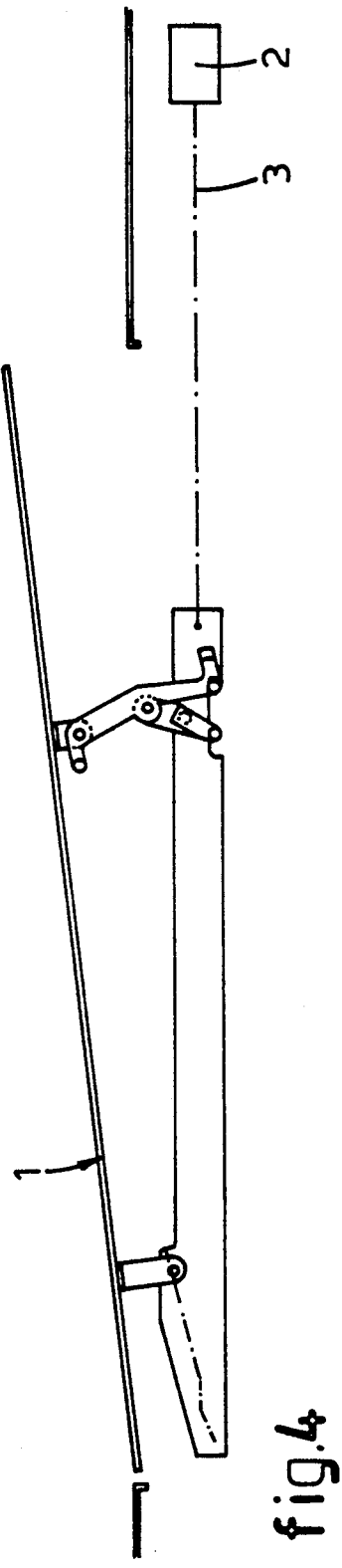
FIG. 4 shows the sliding/tilting roof of FIG. 2, wherein the roof panel is in an open tilting position.

FIG. 1 shows a very simplified block diagram of an apparatus for operating the roof panel 1 of a sliding/tilting roof of a vehicle not further shown, which roof panel 1 is shown in several positions in FIG. 2-4. The roof panel 1 can be driven by an electromotor 2 through a suitable cable 3. As shown in FIG. 1, the motor 2 can be connected to the power supply through make-and-break contacts 4 and 5 of relays 6 and 7, so that the motor 2 can be connected to the supply source for rotation in opposite directions. During rotation in a first direction of rotation from a closed position of the roof panel 1 shown in FIG. 3, the roof panel is slid open, whereas during rotation of the motor 2 in a second direction the roof panel is opened by tilting. For moving the roof panel 1 from an open position into the closed position of FIG. 3, the motor 2 is energized in the second direction opposite to the first direction used for reaching the respective open position, so that energizing for closing the roof panel 1 from the open position of FIG. 2 reached by sliding, corresponds with energizing the motor 2 for opening by tilting from the closed position. Vice versa, energizing the motor 2 for closing the roof panel 1 from the open tilting position of FIG. 4 corresponds with energizing the motor 2 for sliding open from the closed position of FIG. 3.

The apparatus shown in FIG. 1 comprises a control unit 8 adapted to energize the relays 6, 7 through suitable transistors in order to energize the motor 2. A switch 9 is connected to the control unit 8 and functions as a sensor for detecting the closed position of the roof panel 1 according to FIG. 3. Further a manually operable switch 10 is connected to the control unit 8, by means of which the tilting or sliding mode of the roof panel 1 can be chosen. By means of a setting means shown as a potentiometer 11, a desired position of the roof panel 1 can be supplied to the control unit 8.

The operation of the described control unit is as follows.

It is assumed that the roof panel 1 is in the closed position of FIG. 3. This position is signalled by the switch 9 to the control unit 8 and is stored by the control unit 8 in a memory 12 as an initial position. If one chooses with the selector switch 10, for example sliding movement of the roof panel 1 and a certain desired position is indicated by the setting means 11, the control unit 8 computes the energizing period required for reaching the desired position from the value set with the setting means 11 and the predetermined nominal speed of movement of the roof panel 1, during which energizing period the motor 2 must be energized to move the roof panel 1 from the initial position to the desired position. Subsequently the control unit energizes the corresponding relay 6 or 7, whereafter the roof panel is driven by the motor 2 during the computed energizing period. After elapse of this period the motor is de-energized. The reached position is stored in the memory 12 so that the control unit at choosing another desired position with the setting means 11, taking this new initial position as a starting point, can compute an energizing period corresponding with a new desired position.

In order to compensate for a difference between the actual speed of movement and the predetermined speed of movement of the roof panel 1 a speed sensor 13 is mounted, which supplies a signal to the control unit 8 corresponding to the speed of the motor 2 and therefor of the roof panel 1. If the actual speed differs from the predetermined speed of movement, the energizing period of the motor 2 is corrected for this difference.

Moreover, a safety against jamming of the roof panel 1 can be realized by means of this speed sensor 13 in a simple manner. If the control unit 8 determines during energizing the motor 2 that the speed of movement of the roof panel 1 falls below a predetermined minimum speed, the motor 2 is de-energized immediately. Further, the control unit 8 de-energizes the motor 2 if the signal of the movement sensor 13 shows that a deceleration of the roof panel 1 occurs which exceeds a predetermined maximum value. In both cases the control unit 8 subsequently energizes the motor 2 in a reversed direction so that the roof panel 1 is moved backwards along a small distance and undesired strain tensions in the driving mechanism are neutralized in any case. As an alternative it is also possible to energize the motor 2 in a reversed direction until the point of departure of the roof panel 1 is reached again. When the roof panel 1 is moved in the direction of the closed position of FIG. 3, the safety based on the deceleration of the roof panel 1 is switched off at a short distance from the closed position.

A switch 14 is connected to the control unit 8, by means of which the user may switch on or off an automatic closing function. If the automatic closing function is switched on, the control unit 8 provides for an automatic movement of the roof panel 1 into the closed position automatically at switching off the ignition of the corresponding vehicle.

The apparatus described shows the advantage that the control unit is made relatively simple due to the absence of closed control loops and because no special provisions are required for preventing instabilities caused by such control loops.

As there is no position sensor for the roof panel 1, there is no information on the actual position of the roof panel 1 available for the control unit 8 at the installation of the apparatus or at an interruption of the power supply. If the roof panel 1 is in the closed position when the apparatus is put into operation, the switch 9 signals this closed position to the control unit 8 so that the control unit can store this closed position as a fixed initial position in the memory 12. However, if the signal of switch 9 shows that the roof panel is not in the closed position, the position of the roof panel 1 is unknown. I this case, the control unit 8 assumes that the roof panel is in an open tilting position. The control unit 8 now automatically energizes the motor 2 in such a manner that the roof panel 1 is moved from the open tilting position into the closed position. However, the control unit 8 only starts this automatic energizing after operating one of the manually operable actuating means 10, 11, 14 by the user in order to avoid unsafe situations. As soon as the switch 9 signals to the control unit 8 that the closed position is reached, the control unit 8 de-energizes the motor 2 and the closed position is stored in the memory 12.

When after the elapse of a predetermined energizing period, substantially corresponding with the period required for traversing the total tilting way, the control unit 8 determines that the closed position has not yet been reached, the control unit 8 energizes the motor 2 in a reversed direction until the closed position is reached as will be signalled by the switch 9. Energizing in reversed direction also takes place if the control unit 8 within the predetermined energizing period determines from the signal of the movement sensor 13 that the roof panel 1 is apparently jammed in the extreme open sliding position.

When the control unit 8 has stored the closed position as a fixed initial position in the memory 12, the apparatus is ready for normal use.

Although in the described procedure for storing the closed position, the control unit 8 assumes that the roof panel 1 is in an open tilting position, the control unit 8 may also assume an open sliding position, if desired. However, assuming an open tilting position has the advantage that the energizing period required for reaching the closed position is shorter than in the case of assuming an open sliding position.

The described procedure for storing the closed position can also be used in an apparatus with a position sensor for calibrating the position of the respective position sensor corresponding with the closed position.

According to the invention the control unit 8 of the apparatus described is made in such a manner that end positions in tilting and sliding direction are stored in the memory 12, in order to prevent mechanically jamming of the roof panel 1 by means of these end positions. Thereby it is obtained that the apparatus can be used for different types of roofs without any manual adjusting activities, wherein moreover, the full adjustment range of the setting means 11 corresponds always with the full distance of movement of the roof panel 1. When after putting the apparatus into operation, the switch 9 indicates that the roof panel is in the closed position, the motor 2 is energized for moving the roof panel 1 in a sliding direction from the closed position. This energizing is maintained until the signal of the sensor 13 shows that the roof panel 1 has mechanically jammed. Subsequently the control unit energizes the motor 2 in a reversed direction so that the roof panel is moved into the closed position, wherein the motor is de-energized as soon as the closed position has been reached. As soon as the closed position has been reached, the extreme position of the roof panel 1 in the sliding direction can be determined from the signal of the speed sensor 13 and stored as the end position for limiting the distance of sliding movement of the roof panel. Preferably, a value is stored in the memory 11 which lies some millimeters before this extreme position.

Thereafter the motor 2 is energized for moving the roof panel in the tilting direction until the roof panel also mechanically jams in the tilting direction as shown by the signal of the speed sensor 13. At that moment the extreme position in the tilting direction is also known and in the same manner as for the sliding direction. An end position is stored in the memory 12 by the control unit 8. Finally the control unit 8 energizes the motor 2 to move the roof panel 1 back into the closed position whereafter the adjustment of the apparatus is completed.

As the maximum range in which the setting means 11 can be set is known, the control unit 8 can distribute the full setting range of the setting means 11 on the full distance of movement of the roof panel 1 in tilting and sliding direction without having to make a manual adaptation of the apparatus to the type of sliding or sliding/tilting roof to be operated. Thereby the user always has the disposal of the full setting range of the setting means 11. Moreover the control unit 8 always de-energizes the motor 2 shortly before the roof panel will mechanically jam in the extreme positions so that there will be no unnecessary mechanical load of the moving system of the roof panel.

It is noted that the described procedure for storing the closed position as a fixed initial position and for storing the extreme positions of the roof panel in case of using a so-called non-volatile memory has only to be followed at the first putting into operation.

It is further noted that the speed sensor 13 can be made in several ways, for example by means of a Hall element.

The invention is not restricted to the above-described embodiment which can be varied in a number of ways within the scope of the invention.

It is for example possible to provide the apparatus with a position sensor, which provides a signal to the control unit 8 corresponding with the position of the roof panel 1. In that case the respective position will be immediately known at reaching an extreme sliding and tilting position, respectively.

I claim:

1. Apparatus for operating the roof panel of a vehicle, the apparatus comprising: a motor connected to the roof panel for moving the panel between a closed position and an open position, a control unit for energizing the motor and a setting means connected to the control unit for setting a desired position of the roof panel, said setting means having a predetermined setting range, wherein when the apparatus is put into operation the control unit energizes the motor to move the roof panel to an extreme open first position and an extreme open second position, wherein means are provided for storing corresponding extreme open positions of the roof panel in a memory, wherein the control unit restricts during operation the movement of the roof panel as controlled by the setting means by means of the positions stored in the memory, said control unit including means to adapt the setting range of the setting means to the distance of movement of the roof panel between the closed position and the extreme open first position and also between the closed position and the extreme open second position.

2. Apparatus according to claim 1, further comprising a sensor for measuring the speed of movement of the roof panel, wherein the control unit detects the reaching of the extreme open positions by means of the speed sensor.

3. Apparatus according to claim 2, further comprising a sensor for detecting the closed position of the roof panel, wherein the control unit after moving the roof panel from the extreme open positions into the closed position, determines the position of the roof panel in the extreme open positions, respectively, from the signal of the speed sensor.

4. Apparatus according to claim 2, wherein the control unit de-energizes the motor if the speed of movement falls below a predetermined minimum speed.

5. Apparatus according to claim 4, wherein the control unit energizes the motor in a reversed direction of rotation during a short period after said de-energizing of the motor.

6. Apparatus according to claim 4, wherein after said de-energizing, the control unit energizes the motor in reversed direction of rotation until the roof panel is in point of departure.

7. Apparatus according to claim 2, wherein the control unit deenergizes the motor if a deceleration of the roof panel exceeds a predetermined maximum value.

8. Apparatus according to claim 7, wherein during an energizing period of the motor for moving the roof panel into the closed position, the control unit deenergizes the motor if a deceleration of the roof panel exceeds a predetermined maximum value for positions of the roof panel equal to or greater than a predetermined distance from the closed position, the control unit maintaining the energizing until the roof panel arrives in the closed position for positions of the roof panel less than the predetermined distance.

9. Apparatus according to claim 1, wherein after putting the apparatus into operation, the control unit only energizes the motor for moving the roof panel into the extreme positions after operating the setting means.

10. Apparatus according to claim 1, wherein the extreme open first position is an extreme open tilting position and the extreme open second position is an extreme open sliding position.

* * * * *

UNITED STATES PATENT AND TRADEMARK OFFICE
CERTIFICATE OF CORRECTION

PATENT NO. : 5,204,592
DATED : April 20, 1993
INVENTOR(S) : JOHANNES NICOLAAS HUYER It is certified that error appears in the above-identified patent and that said Letters Patent is hereby corrected as shown below:

Col. 6, line 24, before "reversed", insert --a--

Col. 6, line 25, before "point", insert --a--

Signed and Sealed this

Twenty-second Day of February, 1994

Attest:

BRUCE LEHMAN

Attesting Officer    Commissioner of Patents and Trademarks